(No Model.)

H. H. CARPENTER.
SECONDARY BATTERY.

No. 514,260. Patented Feb. 6, 1894.

Witnesses
L. A. Kent.
M. H. Rutherford

Inventor
Hiram H. Carpenter

UNITED STATES PATENT OFFICE.

HIRAM H. CARPENTER, OF ST. LOUIS, MISSOURI.

SECONDARY BATTERY.

SPECIFICATION forming part of Letters Patent No. 514,260, dated February 6, 1894.

Application filed December 21, 1892. Serial No. 455,966. (No model.)

*To all whom it may concern:*

Be it known that I, HIRAM H. CARPENTER, a citizen of the United States, residing at St. Louis, in the State of Missouri, have invented a new and Improved Secondary Battery, of which the following is a full, clear, and exact description, which will enable others skilled in the art to which it appertains to make and use the same.

My invention relates to certain new features of construction in secondary or storage batteries or accumulators, and it consists in the novel construction, combination and arrangement of parts hereinafter specified and designated in the claims.

The object of my invention is to provide an improved secondary battery in which the area or surface of active material, shall be increased over that of batteries now common in the art, and this without a corresponding increase in the weight, bulk or cost of the cell.

Figure 1:
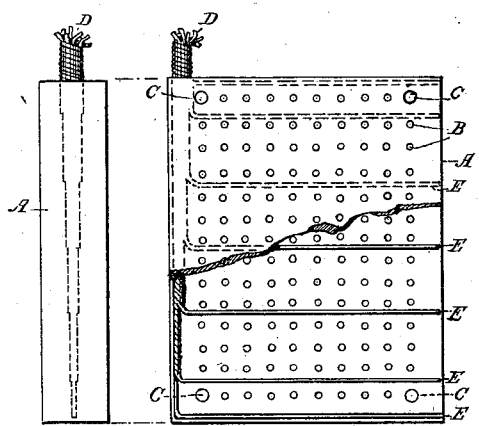
Figures 2, 3, 4:
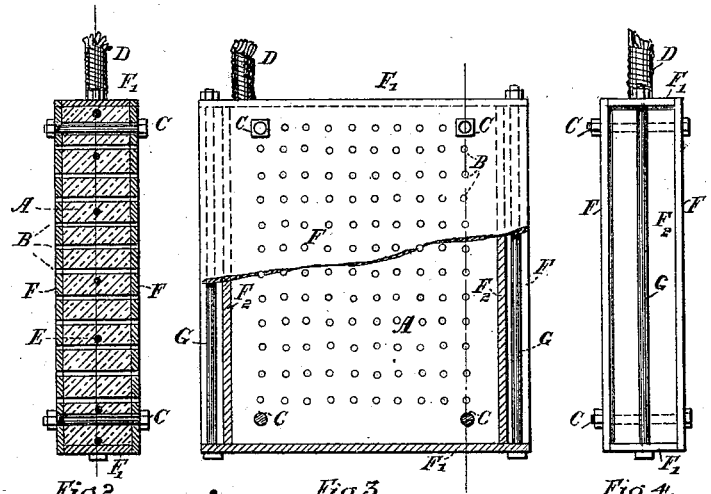
Figure 5:
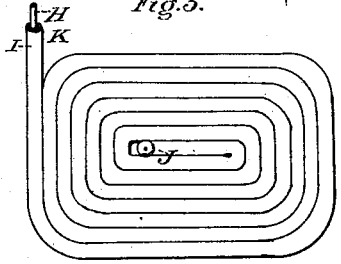

In the drawings, Figure 1 is a sectional side-elevation, and an end elevation, of a block or body of active-material, used in carrying out the invention. Fig. 2 is a transverse sectional-elevation of same. Fig. 3 is a sectional side-elevation of the block of active material in position in an exterior perforated case or shell, with parts broken away. Fig. 4 is an end elevation of the cell complete. Fig. 5 is a side elevation of my improved negative-electrode.

My improved positive electrode is preferably composed of a block or body A of active material or material to become active, and which is preferably rectangular in contour and provided with numerous horizontal perforations B throughout its surface. This body of material is preferably cerusite, although it may be red-lead or other lead-oxides, or any common active material. The body A is also provided with horizontal perforations C adjacent each corner, for the passage of suitable bolts made of insulating material, for the purpose of binding the opposite side plates F of insulating material firmly in position upon opposite sides of said block or body. The insulating sides F are preferably composed of ground or pulverized mica mixed with a paint composed of asphalt and other common ingredients having the chemical quality of resisting the action of the electrolytic fluid, and then compressed or solidified in any known manner into the form of said plates, which are then practically indestructible. These side-plates F are also provided with horizontal perforations B and C which register with like perforations in the block or body A previously described, so that all of said perforations pass horizontally through and through or entirely through the element or cell thus made up.

The terminal or post for the cell is made up of a series of copper or other conducting wires embodied in the active material and extending from edge to edge thereof and throughout the body thereof, and having their adjacent ends twisted together in the form of a cable D, the upper end of which projects above the upper end of the cell, and the ends of all the wires or strips at that point are soldered together, so as to provide a practically solid post or terminal which may be connected up in the usual manner. It will be observed that the post D has the greatest diameter at its upper portion and gradually tapers downward to a point adjacent its lower end. By reason of the wires or strips E being thus distributed throughout the body or block A, the resistance of the said body or block is greatly reduced, and the efficiency of the cell is correspondingly increased, the numerous small perforations B also acting to increase the efficiency of the cell by permitting ready access of the electrolytic fluid to numerous closely adjacent portions of the active material. The wires or strips E may be composed of copper, lead or any good conducting material suitable for the purpose.

In twisting the wires or strips E together to form the terminal D it will be noticed that the said strips or wires are superposed to form the vertical post or terminal.

F' indicates horizontal top and bottom plates and F² the vertical edge plates of the cell which are preferably made of the same insulating material of which the side plates F are composed, and securely clamped together and in position by means of vertical bolts G, so that the active material is surrounded on all sides by the exterior casing or shell of insulating material.

I indicates the negative electrode, which is composed of a common lead pipe or tube in which is located so as to extend from end to end thereof a wire or strip H of copper or any good conducting material, so that one end of said wire or strip projects free beyond the outer end of said pipe or tube, and the opposite end of said wire or strip is sealed within said pipe or tube, by soldering or burning the adjacent end of said pipe or tube. This pipe or tube is entirely devoid of active material, and said wire or strip is in contact therewith from end to end. The free ends of the lead pipe or tube and the wire or strip H project upward adjacent the upper edge of the negative electrode so as to form a terminal or post which may be connected in the usual manner. The pipe or tube is coiled up so as to form what may be termed a flat rectangular coil, as shown in Fig. 5. This method of coiling and forming the negative electrode reduces the same to a very compact and convenient form.

What I claim is—

1. The improved secondary or storage battery, composed of a positive electrode consisting of a block or body of active material perforated by numerous horizontal perforations extending entirely through the same from side to side, side-plates of insulating material applied to opposite sides of said body and having numerous horizontal perforations which extend entirely through the same and register with corresponding perforations in the said block or body of active material, fastenings of insulating material for securing the side-plates to the block or body of active material, and a terminal or post composed of strips of conducting material extending into the active material and disposed throughout the body thereof, and twisted together and superposed to form a vertical post or terminal tapering downward, and the upper ends of said wires or strips projecting above the upper end of the cell and secured together thereat by means of solder or in any common manner, and a negative electrode composed of a lead pipe or tube, and a conducting wire or strip located in said tube and sealed therein, said tube coiled so that the adjacent ends thereof and of said wire or strip project to form a terminal, substantially as herein specified.

2. The improved electrode for a secondary battery, composed of a block or body of active material having numerous horizontal perforations passing therethrough from side to side, opposite detachable side plates composed of insulating material and having numerous horizontal perforations corresponding to the perforations in said body or block of active material and registering therewith, so that the horizontal perforations pass continuously through both the insulating side plates and the block or body of active material, means for securing said side plates in position, and a terminal or post composed of copper wires or strips of conducting material extending into said body or block of active material from one edge to a point adjacent the opposite edge, and twisted together or superposed to form a vertical post which tapers downward, the upper adjacent portions of said wires or strips being soldered or otherwise secured together, substantially as herein specified.

3. The improved electrode for secondary batteries, comprising a bare copper wire or strip H located within a lead-pipe or tube and in contact therewith throughout the length thereof, the said tube being devoid of active material, and having one of its ends soldered or sealed to prevent entrance of the electrolytic fluid, and the tube coiled, substantially as herein specified.

In testimony whereof I affix my signature in the presence of two witnesses.

HIRAM H. CARPENTER.

Witnesses:
L. A. KENT,
J. N. SHIRLEY.